United States Patent [19]

Maciejewski

[11] Patent Number: 5,416,273

[45] Date of Patent: May 16, 1995

[54] STRAIN RELIEF FOR FLEXIBLE WIRE AT FIXED JUNCTION

[75] Inventor: Wendell C. Maciejewski, Salem, Conn.

[73] Assignee: The United States of America as represented by the Secretary of the Navy, Washington, D.C.

[21] Appl. No.: 155,604

[22] Filed: Nov. 22, 1993

[51] Int. Cl.$^6$ ............................................. H02G 15/08
[52] U.S. Cl. ...................... 174/86; 114/215; 114/216; 174/13; 174/40 TD; 174/69; 174/135; 267/73; 267/74
[58] Field of Search ............ 174/86, 70 S, 84 R, 174/13, 69, 135, 40 TD; 114/205, 215, 216; 267/73, 74

[56] References Cited

U.S. PATENT DOCUMENTS

| | | | |
|---|---|---|---|
| 3,823,249 | 7/1974 | Floessel et al. | 174/21 C |
| 3,854,002 | 12/1974 | Glander et al. | 174/69 |
| 4,704,500 | 11/1987 | Shimirak et al. | 174/69 |
| 4,992,629 | 2/1991 | Morais | 174/69 |
| 5,278,353 | 1/1994 | Buchholz et al. | 174/84 R |

FOREIGN PATENT DOCUMENTS

| | | | |
|---|---|---|---|
| 643250 | 9/1950 | United Kingdom | 174/69 |
| 773804 | 10/1980 | U.S.S.R. | 174/86 |

*Primary Examiner*—Morris H. Nimmo
*Attorney, Agent, or Firm*—Micheal J. McGowan; Prithvi C. Lall; Michael F. Oglo

[57] ABSTRACT

In a towed array breakout of the type deployed from or retrieved by naval vessels a junction is defined between a fixed portion of an electrically conductive wire and a movable portion of the wire portion. A relatively hard potting material is provided around and defines the fixed portion of the wire. A coiled helically shaped portion of the same wire or a second wire is integrally joined to the first portion and defines the movable portion. This movable second portion is encased in a relatively soft urethane material so as to provide freedom in both a bending and tension mode. A third portion of the wire is connected to the opposite end of the coiled second portion. This structure affords strain relief at the junction between the fixed portion of the flexible conductor and the movable second portion.

1 Claim, 1 Drawing Sheet

5,416,273

STRAIN RELIEF FOR FLEXIBLE WIRE AT FIXED JUNCTION

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to providing strain relief at the end of a potted wire, and deals more particularly with providing flexibility for the wire immediately adjacent to a potted length of fixed wire in an assembly that provides for flexing and bending of a movable portion of the same wire immediately adjacent to the potted portion.

(2) Description of the Prior Art

Elastomers such as polyurethanes are frequently used in potting applications because of their ease of casting and molding to particular shapes, and because of their ability to resist environmental containments such as water and oils. More specifically, in shipboard applications, such urethanes are frequently used to pot and to waterproof electrical connections. In spite of the use of soft urethane sleeves on flexible electrical conductor wires, failure often occurs at the junction site between the flexible portion of the wire and the hard junction formed by the relatively hard potting material used to secure the fixed portion of the wire. The potting compound comprises a hard urethane or epoxy and is generally contained in a metal barrel that protects other electronic components. The prior art approach to protecting the wire protruding from the barrel at this junction site is to provide a soft urethane sleeve around the wire portion adjacent to the hard potted fixed wire portion.

The above described prior art approach to protecting the junction between a flexible wire and a potted portion such as would be connected to an electrical component in a towed sonobuoy array has been used in towed arrays by U.S. Naval vessels. Such assemblies generally include a towed array having hinged places where the array is designed to fold consisting of wires and electronics potted in both a high durometer stiff urethane or epoxy inside a metal barrel, and a low durometer soft urethane outside of this barrel. During handling such subassemblies are subjected to bending at severe angles, repeated flexing, and abrupt changes in tensile loads. Such severe handling of these subassemblies takes it's toll on the wires where the wires emerge from the relatively hard or stiff potting material. Although the soft polyurethane material generally provided in this area has been thought to alleviate such bending there is little strain relief afforded to the flexible wire at the juncture between it and the relatively hard or stiff potting material. After what can sometimes be a relatively short period of time in service, mechanical fatigue and consequent electrical failure of this flexible wire can occur. This phenomena has been experimentally duplicated in the laboratory and these tests correlate well with actual test results at sea.

Morais, U.S. Pat. No. 4,992,629 discloses a cable shock absorbing apparatus in which a coil spring is mounted in a housing. The cable extends through the housing and has a loop portion within the housing that cooperates with the spring. When the cable is tensioned the housing sections telescope outwardly stretching the spring. Removing the tension relaxes the spring to telescope the housing sections inwardly.

SUMMARY OF THE INVENTION

It is a general purpose and object of the present invention to provide elasticity and strain relief at the junction in a flexible wire where the wire emerges from the relatively stiff potting material.

It is a further object to provide such elasticity and strain relief with a structure having no moving parts other than that necessary for movement of the flexible wire itself.

Another object is to provide an elastic strain relief structure that is easily manufactured and has unlimited configurational capabilities with respect to size of both the wire and the associated assembly. Further, the structure of the present invention is relatively easy to assemble, and the mechanical connections can be accomplished in a variety of ways. The foregoing objects are accomplished with the present invention by providing a portion of the flexible wire in the shape of a helical coil of a plurality of turns, encasing this coil of wire in a relatively soft urethane material, and where necessary providing solder joints between the opposite ends of the coil so as to facilitate integral electrical and mechanical connections between the coil and the flexible wire. As so constructed and arranged the wire can be subjected to bending through substantial angles, flexing, tension, and thermal change without causing fatigue or electrical failure as a result of mechanical overstressing of the conductor wire itself.

BRIEF DESCRIPTION OF THE DRAWINGS

A more complete understanding of the invention and many of the attendant advantages thereto will be readily appreciated as the same becomes better understood by reference to the following detailed description when considered in conjunction with the accomanying drawings wherein.

DESCRIPTION OF THE PREFERRED EMBODIMENT

Figure 1:
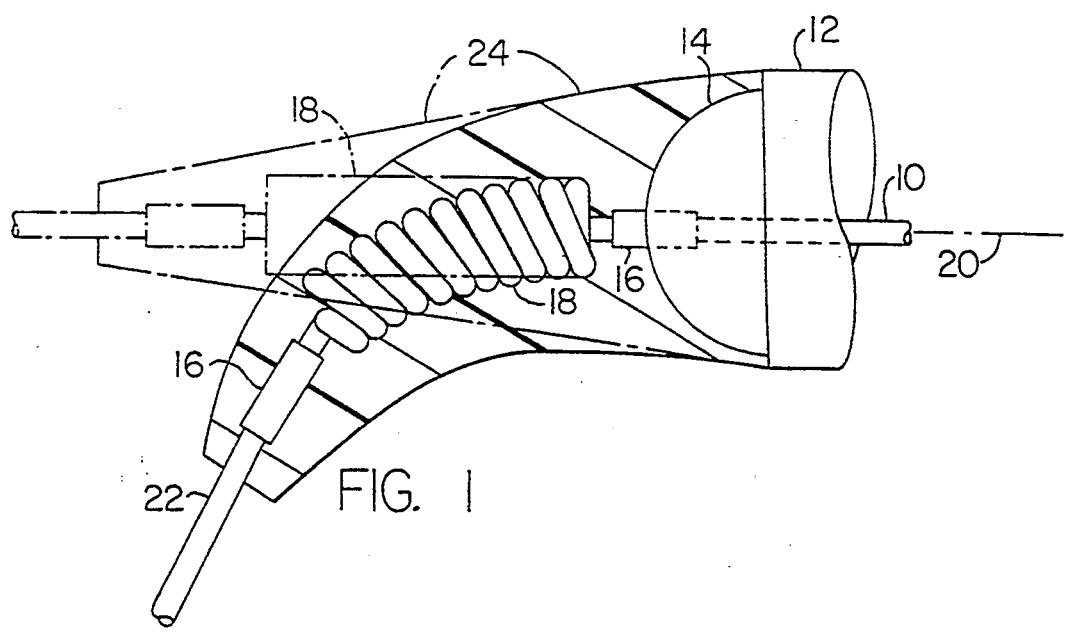
FIG. 1 is a sectional view taken through a strain relief structure provided at a fixed junction as constructed in accordance with the present invention, and illustrates the structure in a deformed condition in solid lines, and in broken lines in its undeformed configuration.

Referring now to FIG. 1 there is shown a first support structure encasing a first portion 10 of a flexible electrically conductive wire. This first support structure includes metal outer barrel 12 that serves to encase electronic components of a towed array and that in the vacant space therein contains a hard urethane or epoxy material as indicated generally at 14 inside the barrel and surrounding the first wire portion 10. Barrel 12 is one of many such barrels in the array which along with the hydrophone elements (not shown) are strung together by connected wires within tubing (not shown), which in jargon of the Navy's sailors is called "the hose". Vacant space within the hose is filled with a viscous liquid. Although not required, a solder lug 16 may be provided in the event that the first wire portion 10 must be detachably electrically connected to a second portion 18 of the flexible wire.

It is an important feature of the present invention that this second portion 18 of the flexible wire comprises a helically shaped coil with a plurality of turns such that the resulting coil shape can be deformed in bending relative to the original axis of the flexible wire portion 20. The wire axis 20 is shown in its undeformed condition in broken lines in FIG. 1, with the undeformed coil configuration being indicated schematically by reference to the broken line rectangle 18.

The flexible second coil wire portion 18 is connected to a third portion as indicated generally at 22 by means of a soldering lug 16 as shown in FIG. 1. However, it will be apparent that the flexible coil portion 18 of the wire shown can comprise a continuous portion of these first and third portions 10 and 22 respectively rather than being integrally joined as by the solder connections 16.

Another important feature of the present invention is attributed to the soft urethane casing 24 provided for the flexible coil wire portion 18 and its associated solder connection 16, 16. This soft urethane casing 24, while old in the art of itself, as shown in FIG. 2, is preferably used with the flexible coil 18 as described above in order to enhance the bending characteristics of this coiled portion 18 of the wire conductor.

It will be apparent that the axis of the third portion of wire 22 will be displaced angularly with respect to the axis 20 of the relatively rigidly held first portion 10 so as to accommodate the repeated loads imposed upon a towed array at the place or places where the array is designed to flex or bend for storage and ease in array deployment, etc.

Figure 2:
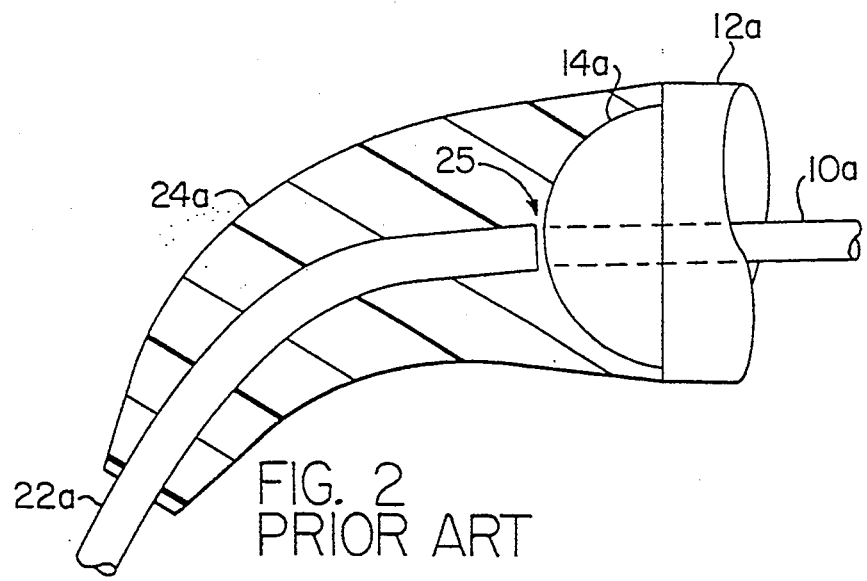
FIG. 2 is a sectional View of a prior art structure as described previously, the prior art structure being illustrated only in a deformed condition, with failure shown at the point where the flexible wire would normally be integrally connected to the fixed portion in the potting material.

FIG. 2 shows a prior art junction between a flexible wire 22a and a portion 10a potted in relatively hard urethane potting material and provided in a barrel 12a of the type described previously with reference to elements 10 and 12. More specifically, the relatively rigidly held portion 10a of the flexible wire conductor is shown encased in a conventional hard potting material 14i a l provided inside the barrel 12a. The flexible wire 22a is shown in a deformed condition, and although encased in a relatively soft urethane 24a the failure indicated generally at 25 illustrates the problem associated with this prior art approach to conventional junction structures of the type that the present invention is designed to replace.

Obviously many modifications and variations of the present invention may become apparent in light of the above teachings. For example, where the flexible wire is of relatively small diameter, and must be further protected from the environment, it would be possible to provide an envelope or bellows for the coil portion 18 in order to further enhance the advantages of the present invention. Such a bellows would keep urethane out of the coils. As mentioned previously the solder type sleeves provided at each end of the coil portion of the flexible wire 18 are not required in some installations, and the wire itself may be formed into a coil shape where the metallurgical characteristics of the flexible electrical conductor permits such simplification. Finally, where the flexible conductive wire cannot be so formed and where solder type lugs are not feasible in particular applications, the present invention also contemplates the use of a spring wire provided in a spiral shaped plastic sleeve for the flexible wire so as to assure that the electrical conductor takes on the appropriate helically shaped coil configuration as shown and described with reference to FIG. 1.

In light of the above, it is therefore understood that within the scope of the appended claims, the invention may be practiced otherwise than as specifically described.

What is claimed is:

1. A strain relief structure for flexible wire comprising:
   a flexible electrical wire;
   first support structure encasing a first portion of said flexible wire in a non-bending mode;
   said flexible wire further including a bendable second portion integrally connected to said first portion of said flexible wire by a solder lug;
   said second portion being of helical shape with a plurality of turns and defining a coil;
   said coil readily accommodating a bending mode for the second portion of said flexible wire relative to said first portion encased in said first support structure;
   said flexible wire further including a third portion integrally connected to an opposite end portion of said coil second portion by means of a solder lug;
   said bendable second wire portion is encased in a soft urethane material, and said first support structure includes a hard urethane potting material encasing said first wire portion to constrain same in said non-bending mode; and
   whereby the flexible wire can accommodate repeated thermal, torsional bending and tension stresses in the area of said flexible wire at the juncture between said first and second portion.

* * * * *